Oct. 3, 1967   J. M. CUMBERLAND   3,345,110
KNOCK-OFF TYPE WHEEL RETAINERS
Filed March 23, 1965   2 Sheets-Sheet 1

INVENTOR
JOSEPH M. CUMBERLAND

BY Fisher, Christen, Sabol & Caldwell
ATTORNEYS

Oct. 3, 1967  J. M. CUMBERLAND  3,345,110
KNOCK-OFF TYPE WHEEL RETAINERS
Filed March 23, 1965  2 Sheets-Sheet 2

INVENTOR
JOSEPH M. CUMBERLAND

BY *Fisher, Christen, Sabol & Caldwell*
ATTORNEYS

United States Patent Office 3,345,110
Patented Oct. 3, 1967

3,345,110
KNOCK-OFF TYPE WHEEL RETAINERS
Joseph M. Cumberland, Muskogee, Okla.
(Box 22, Parker, Pa. 16049)
Filed Mar. 23, 1965, Ser. No. 442,213
2 Claims. (Cl. 301—9)

This invention relates to an improved apparatus and method for holding wheels of all types to axles or hubs of the type presently using the conventional nut and bolt method.

More particularly, this invention relates to apparatus which can be easily adapted to most wheels with a minimum of special parts, and allow the wheel to be removed or replaced easily, using only a hammer.

An object of the invention is to provide means to adapt present wheels to the "knock-off" method with a minimum of machined parts.

A further object of the invention is to provide a means of allowing machinery or automobile wheels to be safely attached and easily removed from their hubs or axles without the use of wrenches.

A still further object of the invention is to provide a wheel retaining method that will eliminate the need for wrenches, so that the wheel changing task might be accomplished by those not physically strong enough to use the conventional bolt-on method.

Another object of the invention is to provide a "knock-off" method of retaining wheels to machinery and automobiles, so that the advantages of a fast wheel change may be realized, as is often required for racing cars or in machinery gear or pulley changes.

A still further object of the invention is to provide a "knock-off" type wheel retaining method with the addition of only a small amount of weight, thus not greatly upsetting the ratio of sprung to unsprung weight which would change the handling characteristics of the automobile.

A further object of the invention is to provide a safe method of retaining wheels to hubs with the additional safety of a lock which will prevent the retainer from being turned until the lock is released.

The above and other objects and features of the invention will be seen from the following detailed description taken with the accompanying drawings wherein.

Figure 1:
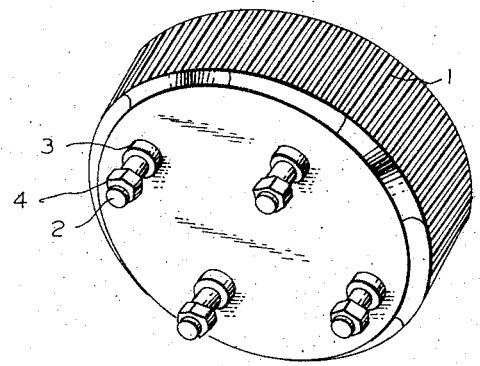
FIG. 1 is a view in perspective of a wheel mounting base, shown here as an automobile brake drum with studs.

In FIG. 1 there is shown an automobile brake drum 1 with conventional wheel holding studs 2 tapered wheel locating sleeves 3 and conventional wheel retaining nuts 4.

Figure 2:
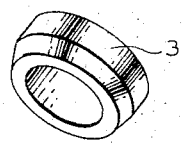
FIG. 2 is a view in perspective of a tapered wheel locating sleeve.

In FIG. 2 the tapered wheel locating sleeve 3 is shown enlarged.

Figure 3:
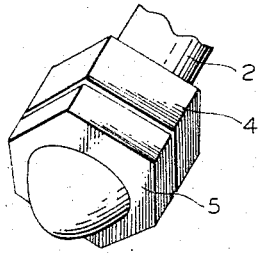
FIG. 3 is a view in perspective of a wheel stud with retaining nut and decorative jam nut.

In FIG. 3 there is shown the wheel holding stud 2, with retaining nut 4 and a decorative jam nut 5. Jam nut 5 is a suggested means of locking the wheel retaining nut in the desired position.

Figure 4:
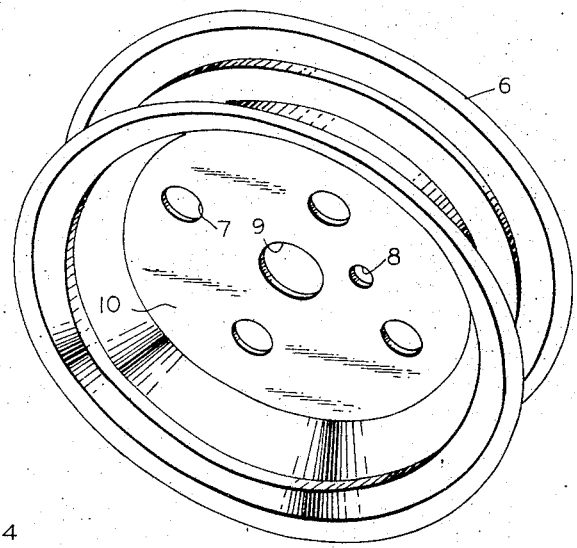
FIG. 4 shows a wheel in perspective.

In FIG. 4 a typical automobile wheel 6 is shown with enlarged wheel mounting holes 7 to accept the wheel retaining nuts and to fit the locating sleeves. A hole 8 is provided for the safety locking pin. A wheel center hole 9 sometimes used to help locate the wheel in a proper position is shown in the wheel mounting base 10.

Figure 5:
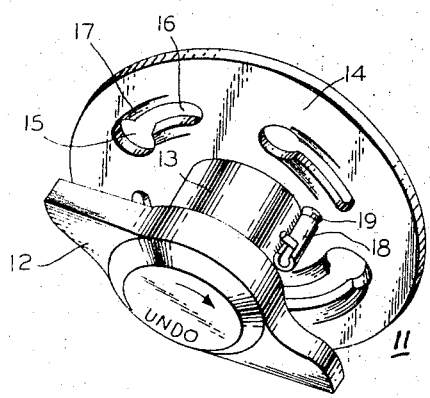
FIG. 5 shows the wheel retainer mechanism, left hand type in perspective.

In FIG. 5 the knock-off type wheel retainer 11, left hand style is shown. A suggested impact head 12, shown here as decorative and non-removable could be designed to be placed on the wheel retainer only when it is needed to turn the wheel retainer, thus allowing for the use of conventional wheel covers or hub caps. The hollow retainer axis 13 connects the impact head 12 to the retainer base 14. Deeper or wider wheels would require this axis to be longer or and the impact head lugs to be turned in a more outward position so that the hammer could more easily contact them. The retainer hole 15 is large enough to permit entrance and passage of the wheel stud with its retaining nut 4. Curved slot 16 is on the same radius as the wheel mounting studs 2 and is slightly wider than the diameter of the wheel studs. Milled portion 17 is as wide as the wheel nuts 4 and is milled in such a manner as to cause the base plate 14 to become gradually thicker at the slot 16 end than at the stud holes 15 thus forming a smooth arced inclined plane from each hole 15 to its slot 16 end. Safety lock 18 comprises a spring loaded pin which penetrates the retainer 14 through hole 19 and will locate in wheel 8 to prevent the retainer from turning thereby allowing the wheel to loosen.

Figure 6:
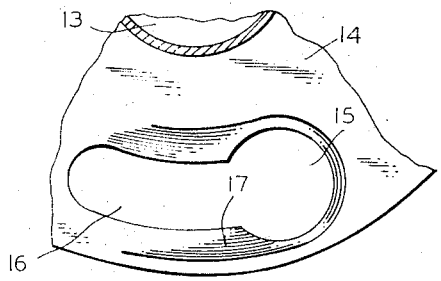
FIG. 6 is a broken view in elevation to show one of the holes of the retainer mechanism with its connecting arced slot.

In FIG. 6 a section of the retainer base 14 is shown revealing the retainer axis 13 and the retainer hole 15, 16 is the arced slot 16, and the milled surface or inclined plane 17.

Figure 7:
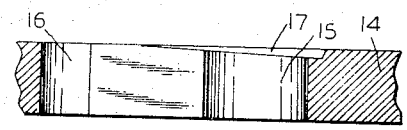
FIG. 7 is a cross sectional view of the structure of FIG. 6 showing the hole with its slot.

In FIG. 7, the cross section of a portion of the retainer base 14, with hole 15 and slot 16 is visible, as well as the milled portion, or inclined plane 17.

Figure 8:
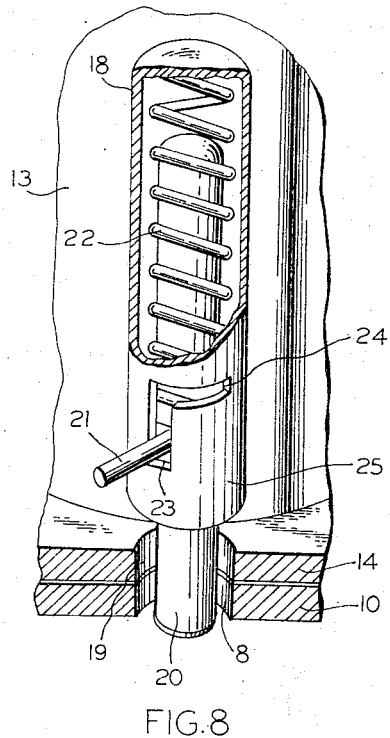
FIG. 8 is a view in perspective of a safety lock pin.

In FIG. 8, a detail of a suggested safety lock is shown at 18, attached to the retainer axis 13 and comprising a spring 22 with loaded pin 20 and within a housing 25. Selecting lever 21 with locked and released positions 23 and 24 respectively. The retainer base 14 is provided with a hole 19 through which the pin 20 can easily pass. A cross section 10 of a retained wheel with locking or locating hole 8 for the pin 20 is also seen.

Figure 9:
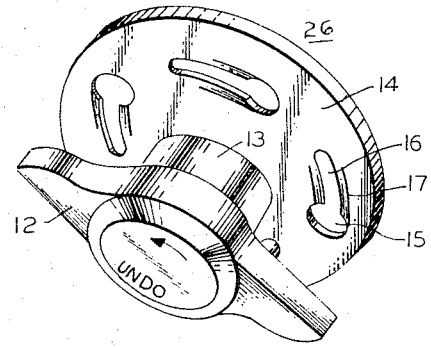
FIG. 9 is a view in perspective of the wheel retainer mechanism, right hand type.

In FIG. 9 another knock-off type wheel retainer 26, which tightens when right hand, or clockwise torque is applied, is shown being, the reverse of 11, in FIG. 5. Otherwise the structures 11 and 26 are similar and are identically numbered and named.

Figure 10:
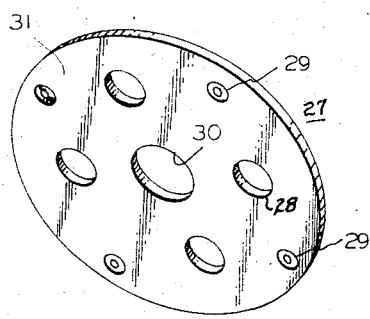
FIG. 10 shows in perspective an optional wheel retainer adapter plate.

In FIG. 10 an adapter plate 27 is shown with holes 28 the same size and in the same location as the wheel stud holes 7. Countersunk holes 29 are provided for fastening the adapter plate 27 to a wheel. The center hole 30 is provided to match the wheel hole 9. This adapter plate is necessary only to cover and fill any irregularities in a wheel, and to present a smooth surface for the wheel retainer to fit.

Figure 11:
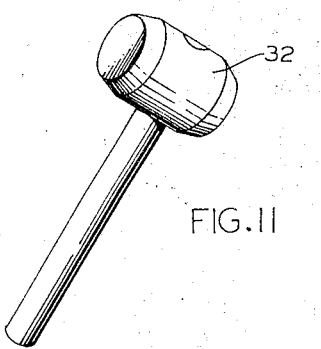
FIG. 11 shows a hammer in perspective.

In FIG. 11 a heavy soft headed hammer 32 is depicted and is necessary to move the wheel retainers to a tight or loose position without marring the decorative design of the impact head and lugs.

The drawings show the invention application to wheels of automobiles, but is also applicable to any wheels now using bolts and nuts as their means of retention.

The only wheel modification necessary to use the retainer is that the stud holes 15 must be enlarged enough to allow the retaining nuts to pass through where formerly only the stud 2 went through the wheel and the nuts were then tightened against the outside of the wheel. The retaining or safety hole 8 in the wheel is not a necessity just an added safety feature to ensure against unwanted loosening of the wheel retainer. The device will not loosen undesirably if the inclined plane 17 completes its path of climb from the hole 15 to the slot 16 end far enough from the slot end that when the stud 2 strikes the slot 16 end the under surface of the nut 4 is beyond the inclined surface 17 and now rests on the unmilled flat surface of the retainer base 14.

To install the device, first place a tapered locating sleeve 3 on each stud 2. Then place the wheel on the studs 2 so that the locating sleeves 3 fit into the enlarged wheel holes 7. The tapered portion of sleeves 3 face outward and aid in proper location of the wheel. Next, the wheel retainer 11 or 26 is placed on the studs 2 and positioned so that the studs are at the small end of the slots 16. Then the retaining nuts 4 are screwed on the studs 2 and tightened in place using a wrench. Next, the ornamental jam nuts 5 are tightened in place. Now initial installment and adjustment is complete. To remove or replace the wheel all that is now needed is a hammer and to accomplish this: the safety pin 20 is pulled up to its released position 24 in FIG. 8. This compresses the spring 22 and removes the end portion of the pin 20 from the locking hole 8 in the wheel. Then, depending on whether or not the retainer is left or right hand, the impact head 12 is struck with the hammer 32 in the proper direction. The hammer head is of a material, as lead or brass, to lessen danger of marring the ornamental impact head of the retainer. As the impact head 12 axis 13 and base 14 turn each inclined plane 17 slides beneath its retaining nuts 4 and jam nuts 5 and since the base plate thickness at these points becomes, in this case, less, the pressure applied to the wheel lessens until the base plate retainer holes 15 come beneath the retaining nuts 4 and allow the wheel retainer 11 and wheel 6 to be pulled off. This is possible since the holes 7 in the wheel 6 and the matching holes in the retainer base plate 14 are larger than the retaining nuts 4. Replacing of the wheel is accomplished by locating the wheel holes 7 on the locating sleeves 3 placing the retainer 11 on the studs 2 and then hammering the impact head lugs in the proper direction.

All this can be accomplished in a matter of seconds, and with a far lesser amount of effort than conventional methods.

Further explanation may be necessary for FIG. 10 which shows the base plate adapter. Some wheels may have irregularities, such as strengthening protrusions or ribs at their centers. In these cases, it may be necessary to have an adapter with one side shaped to receive these protrusions and the other side smooth to receive the wheel retainer base. These adapter plates could be fastened to the wheel by countersunk screws since their only purpose is to supply a smooth surface for the retainer base to face on. In cases where adapter plates are used, it may be necessary to use longer wheel retainer studs.

The preceding description has been applied particularly to automobile wheels but as can be readily perceived, the invention is of advantage to many types of wheels in many different applications, and it is not intended to limit the uses of the retainer to the field of automobile wheels alone.

As many changes could be made in carrying out the construction without departing from the scope of the invention, it is intended that all matter contained in the above description or shown in the accompanying drawings shall be interpreted as illustrated and limited only by the appended claims herein. What is claimed is:

1. A knock-off type wheel assembly which includes a brake drum having spaced apart studs with stud nuts thereon spaced from the drum comprising, in combination a wheel having stud openings to receive the studs with stud nuts thereon; wheel retainer means comprising a disc having spaced apart arc-shaped openings; said openings characterized by an enlarged end to receive said studs with stud nuts thereon and an arcuate slotted portion of a width to accommodate the studs; said disc having inclined planes adjacent each slotted portion along opposite edges thereof to receive the stud nuts; said inclined planes rising in the direction away from said enlarged ends to and including the surface of the disc to wedge the disc to the wheel through engagement of the nuts and planes; means for locking the wheel retainer means to the wheel when said nuts are so engaged; an impact head centrally secured to the retaining means for rotating the disc relative to the studs; tapered locating sleeves on each stud adjacent the drum to fit the stud openings; and jam nuts on the projecting ends of the studs to maintain the stud nuts locked on the studs.

2. A knock-off type wheel assembly which includes a brake drum having spaced apart studs with stud nuts thereon spaced from the drum comprising, in combination a wheel having stud openings to receive the studs with stud nuts thereon; wheel retainer means comprising a disc having spaced apart arc-shaped openings; said openings characterized by an enlarged end to receive said studs with stud nuts thereon and an arcuate slotted portion of a width to accommodate the studs; said disc having inclined planes adjacent each slotted portion along opposite edges thereof to receive the stud nuts; said inclined planes rising in the direction away from said enlarged ends to and including the surface of the disc to wedge the disc to the wheel through engagement of the nuts and planes; means for locking the wheel retainer means to the wheel when said nuts are so engaged; an impact head centrally secured to the retaining means for rotating the disc relative to the studs; and an adapter plate having openings conforming to the wheel openings and disposed between the wheel and the wheel retaining means to present a flat surface to the disc.

References Cited
UNITED STATES PATENTS

| | | | |
|---|---|---|---|
| 1,611,069 | 12/1926 | Putnam | 301—9 |
| 2,244,083 | 6/1941 | Richter | 301—9 |
| 2,552,936 | 5/1951 | Chatterton | 301—9 |
| 2,632,674 | 3/1953 | Lambert | 301—9 |
| 2,632,675 | 3/1953 | Richard | 301—9 |

BENJAMIN HERSH, *Primary Examiner.*

R. J. JOHNSON, *Assistant Examiner.*